United States Patent
Abatzoglou et al.

(10) Patent No.: US 8,816,896 B2
(45) Date of Patent: Aug. 26, 2014

(54) ON-BOARD INS QUADRATIC CORRECTION METHOD USING MAXIMUM LIKELIHOOD MOTION ESTIMATION OF GROUND SCATTERERS FROM RADAR DATA

(75) Inventors: Theagenis J. Abatzoglou, Huntington Beach, CA (US); Johan E. Gonzalez, Carson, CA (US); Joel K. McWilliams, Highland Village, TX (US); Raymond Samaniego, Prosper, TX (US)

(73) Assignee: Raytheon Company, Waltham, MA (US)

( * ) Notice: Subject to any disclaimer, the term of this patent is extended or adjusted under 35 U.S.C. 154(b) by 347 days.

(21) Appl. No.: 13/469,539

(22) Filed: May 11, 2012

(65) Prior Publication Data

US 2013/0300599 A1    Nov. 14, 2013

(51) Int. Cl.
*G01S 13/58*         (2006.01)
(52) U.S. Cl.
USPC .......... 342/105; 342/25 R; 342/109; 342/114; 342/139

(58) Field of Classification Search
CPC ..................................................... G01S 13/90
USPC ......................... 342/25, 105, 109, 114, 139
See application file for complete search history.

(56) References Cited

U.S. PATENT DOCUMENTS 7,969,345 B2    6/2011   Abatzoglou et al.
2010/0259442 A1*  10/2010  Abatzoglou et al. ........ 342/25 A

* cited by examiner

*Primary Examiner* — Timothy A Brainard
(74) *Attorney, Agent, or Firm* — Christie, Parker & Hale, LLP

(57) ABSTRACT

System and method for calculating three dimensional residual motion errors of a moving platform with respect to a point of interest by receiving a radar signal from the point of interest (302); forming a radar image including a plurality of scatterers (304); using an MLE method to obtain range, radial velocity and acceleration of the moving platform for a first peak scatterer in the radar image (306); correcting a location of the first peak scatterer with respect to a scene center of the point of interest (312); updating the obtained radial acceleration responsive to the corrected location (314); and updating the obtained radial velocity of the moving platform responsive to the updated radial acceleration (316).

12 Claims, 4 Drawing Sheets

ON-BOARD INS QUADRATIC CORRECTION METHOD USING MAXIMUM LIKELIHOOD MOTION ESTIMATION OF GROUND SCATTERERS FROM RADAR DATA

FIELD OF THE INVENTION

The present invention relates to signal processing for antennas and more specifically to an on-board INS quadratic correction method using maximum likelihood motion estimation of ground scatterers from radar data.

BACKGROUND

Fast and accurate estimation of target range, range rate (i.e., radial velocity), and acceleration from sampled radar return signals is necessary for some radar applications. Similarly, accurate estimation of the motion parameters of a moving platform, such as an aircraft, having a radar system therein is crucial for accurate estimation of a "point of interest" on the ground. For example, joint estimation of these target or platform motion parameters is an important precursor to motion compensation for high resolution spectral analysis of targets and synthetic aperture radar (SAR) processing. The joint estimation of platform motion parameters is also applicable in SAR imaging of landing areas during degraded visual conditions. For example, the military continues to suffer both equipment damage and injury to personnel due to mishaps when landing in degraded visual environments (DVEs).

There are air-to-ground applications, such as SAR imaging applications, that rely on information from an Inertial Navigational System (INS) to produce well focused images. An INS is a navigation aid that uses a computer, motion sensors (accelerometers) and rotation sensors (gyroscopes) to continuously calculate the position, orientation, and velocity (direction and speed of movement) of a moving object without the need for external references. However, current INS systems have measurement biases that can substantially impact the quality of the formed SAR images.

Many conventional radar systems attempt to accurately and expeditiously estimate target motion parameters. Some techniques used by conventional systems include the maximum entropy technique, the phase-gradient autofocus technique, and the phase difference autofocus technique, among others. However, a canonical autofocus technique may not be used to correct the INS errors, because of spatially varying quadratic phase in wide area imaging applications. Furthermore, INS accuracy may not be sufficient for imaging at the some short wavelengths, for example, Ku band wavelengths (~2 cm). Moreover, large scene size (for example, 300 m×300 m) relative to range, requires that corrections to INS data be made relative to the scene center (i.e., point of interest).

Maximum likelihood estimation (MLE) is a popular statistical method used to calculate the best way of fitting a mathematical model to some data. Modeling real data by estimating a maximum likelihood offers a way of tuning the free parameters of a model to provide an optimum fit. As a result, some conventional systems have utilized the MLE technique for the determination of target motion parameters. In these cases, the MLE reduces to finding the maximum of a nonlinear 3-dimensional (3D) likelihood function. The range-velocity projection of the likelihood function behaves like an ambiguity function with a main lobe accompanied by surrounding side lobes that introduce many local maxima. The extent of the main lobe is given by the radar range and velocity resolution formulas, known to those skilled in the art. The MLE technique is used in some embodiments of this invention because of its high accuracy and robustness in the presence of noise.

SUMMARY

In some embodiments, the present invention is a computer implemented method for calculating three dimensional residual motion errors of a moving platform with respect to a point of interest. The method includes: (a) receiving a radar signal from the point of interest; (b) forming a radar image including representation of the point of interest and a plurality of scatterers; (c) using a maximum likelihood estimation (MLE) method to obtain range, radial velocity and radial acceleration of the moving platform for a first peak scatterer with a brightest point in the radar image; (d) correcting a location of the first peak scatterer with respect to a scene center of the point of interest; (e) updating the obtained radial acceleration of the moving platform responsive to the corrected location of the first peak scatterer; and (f) updating the obtained radial velocity of the moving platform responsive to the updated radial acceleration. Steps (d), (e), and (f) are recursively repeated for a predetermined number of times for the first peak scatterer, in a step (g). Finally, steps (c), (d), (e), (f), and (g) are repeated for a second and a third scatterers in the radar image to obtain the three dimensional residual motion errors of the moving platform.

In some embodiments, the present invention is an onboard radar system for calculating three dimensional residual motion errors of a moving platform with respect to a point of interest. The radar system includes: an antenna for receiving a radar signal from the point of interest; and one or more processors configured to (a) form a radar image including representation of the point of interest and a plurality of scatterers, (b) use a maximum likelihood estimation (MLE) method to obtain range, radial velocity and radial acceleration of the moving platform for a first peak scatterer with a brightest point in the radar image, (c) correct a location of the first peak scatterer with respect to a scene center of the point of interest, (d) update the obtained radial acceleration of the moving platform responsive to the corrected location of the first peak scatterer, (e) update the obtained radial velocity of the moving platform responsive to the updated radial acceleration, (f) recursively repeat (c), (d), and (e) for a predetermined number of times for the first peak scatterer; and (g) repeat (b), (c), (d), (e), and (f), for a second and a third scatterers in the radar image to obtain the three dimensional residual motion errors of the moving platform.

The determined three dimensional residual motion errors of the moving platform are substantially insensitive to height variation of the scatterers and may be used to better focus a synthetic aperture radar (SAR) image.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

In some embodiments, the present invention is directed to a computer implemented method for assessing line of sight residual motion errors (INS errors) using a dominant scatterer focusing algorithm that estimates range, radial velocity and acceleration by maximum likelihood estimation method. For example, using a computationally efficient recursive algorithm. The present invention executing on one or more processors/computers estimates the equivalent radial acceleration relative to the scene center from the maximum likelihood focusing point. The INS data is then corrected to the second order. By utilizing multiple scatterers, the method of the present invention generalizes the process and estimates INS errors in three dimensions.

In some embodiments, the end result is an improvement to the navigation solution that can be used with a back projection process to generate a focused SAR image. The corrected results can also be used to diagnose and rectify systematic biases in the navigation solution in applications other than SAR imaging. The improved navigation solution can also be used in other radars modes, for example, Ground Moving Target Indicator (GMTI) and Doppler Beam Sharpening (DBS).

Figure 1:
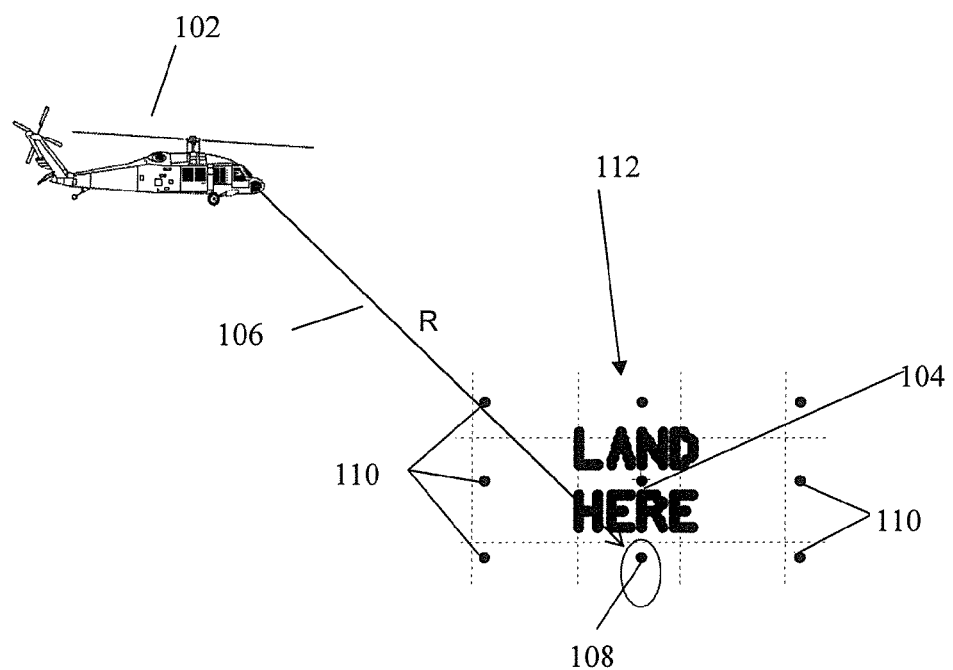
FIG. 1 shows a moving platform including a radar system and a point of interest on the ground, according to some embodiments of the present invention.

FIG. 1 shows a moving platform including a radar system, and a point of interest on the ground, according to some embodiments of the present invention. As shown, aircraft 102 is trying to land on an area of interest 112 on the ground, using its on-board radar and INS. The area of interest 112 includes a scene center 104, a focusing point 108 and multiple scatterers 110. The scatterers 110 may include buildings, landmarks, equipment, hills, grass, and the like, each of which has a different radar signal scattering characteristic. In this example, R is the range estimate of the aircraft 102 to the focusing point 108 along the line of sight 106. Similarly, R' is the radial velocity estimate and R" is the radial acceleration estimate. The scene center is the point of interest on the ground, where in some embodiments, is selected by the radar operator. The focusing point is determined by finding the most prominent scatterer in the image, that is, the brightest point in the uncorrected radar image. For example, the uncorrected radar image is formed by taking a two dimensional Fourier transform of the baseband signal after range deskew and coarse motion compensation. The brightest point then corresponds to the cell with the highest amplitude in the Fourier transform buffer, as is commonly known to those skilled in the art.

In some embodiments, the present invention obtains the square components of the aircraft's acceleration (with respect to the scene center 104), by using multiple scatterers 110 in the image and a recursive calculation process. In other words, the computer executed method of the present invention uses an MLE method to find the R, R' and R" of each of the several scatterers 110. Accordingly, an improved navigation solution is obtained with the correct square components of acceleration. The improved navigation solution can then be used in numerous airborne applications, such as SAR imaging with special operations platforms, combat search and rescue, medivac, and transport rotorcraft platforms. Radar targets are typically modeled by the superposition of point scatterers over a small viewing angle and a moderate frequency band surrounding the RF signal. The MLE methods for estimating target motion parameters (e.g., range, radial velocity, and radial acceleration), is improved when the target has a dominant scatterer or one of its dominant scatterers can be isolated from the others, for example, when the isolated dominant scatterer is in a separate range-doppler resolution cell. The dominant scatterer returns are then processed by the MLE method to obtain values for range, radial velocity, and acceleration.

Figure 2:
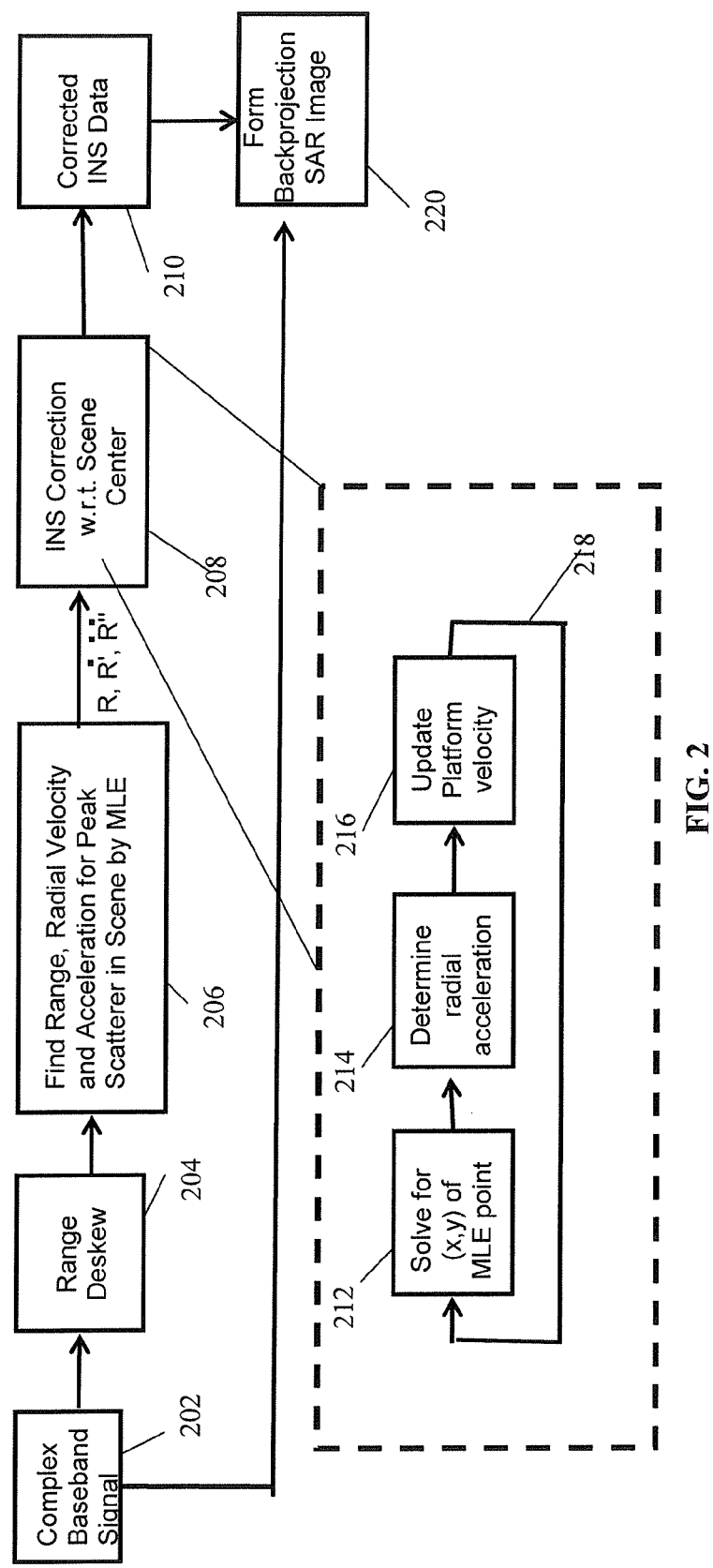
FIG. 2 is an exemplary process flow diagram for INS data correction along a line of sight using MLE, according to some embodiments of the present invention.

FIG. 2 is an exemplary process flow diagram for INS data correction along a line of sight using MLE, according to some embodiments of the present invention. As shown in block 202, a (complex) baseband signal is received by the (antenna of) the on-board radar system, which include one or more processors or computers. The baseband signal is essentially the radar return signal from all scatterers in the scene. Accordingly, it contains the brightest scatterer as well as all other scatterers in the scene. The processor(s) perform a pre-processing including range de-skewing on the received baseband signal to demodulate the effects of the transmitted waveform, for example, the amplitude of the received signal, to form a radar image that includes a representation of the point of interest and a plurality of scatterers, in block 204. Radar returns are typically baseband signals output from a radar system after preprocessing. Preprocessing is typically executed by a system including amplification, filtering, and other signal processing as is known to those skilled in the art, resulting in a baseband signal.

In block 206, the processor(s) obtain range (R), radial velocity (R') and acceleration (R") for a dominant scatterer, which may not be at the scene center (i.e., the brightest point in the uncorrected radar image) in the scene by MLE method. An exemplary MLE method is described in the co-owned U.S. Pat. No. 7,969,345, the entire contents of which is hereby expressly incorporated by reference.

The above-mentioned exemplary method for implementing a maximum likelihood estimator for making a joint estimation of range, range rate, and acceleration of a target utilizes a pulse doppler radar. The MLE of target motion parameters are then determined by keystone processing a baseband signal from the pulse doppler radar, and generating a first estimate of the motion parameters based on the processed signal. The first estimate is utilized to set up sampling intervals for the performance of a coarse search. Then, a fine search is performed using Newton's method to determine the MLE. This exemplary method utilizes an autofocus to account for linear and quadratic range migration. Furthermore, Keystone processing is utilized to account for linear range migration, in which a coarse search is performed in range, doppler, and doppler rate. Subsequently, a fine search is performed over the parameter space. This method can be applied to an arbitrary pulse train waveform.

Referring back to FIG. 2, the outputs (range (R), radial velocity (R') and acceleration (R")) from block 206 are fed to block 208, in which the processor performs corrections of the INS data with respect to the scene center. In some embodiments, the INS data correction includes correcting for location (X and Y parameters) of the focusing point with respect to the scene center, in block 212. The radial acceleration is then updated in block 214, based on the X and Y parameters of the focusing point. Subsequently the platform (e.g., the aircraft) velocity vector is updated, in block 216. This process of INS data correction (block 208) is recursively repeated for the same MLE focus point in the radar image to obtain corrected INS data along the line of sight, with respect to the scene center. The corrected INS data (block 210) may then be used to form backprojection of a SAR image resulting in a more focused SAR image, in block 220. The process of FIG. 2 may then be extended in three dimension to obtain a complete correction of the INS data.

Figure 3:
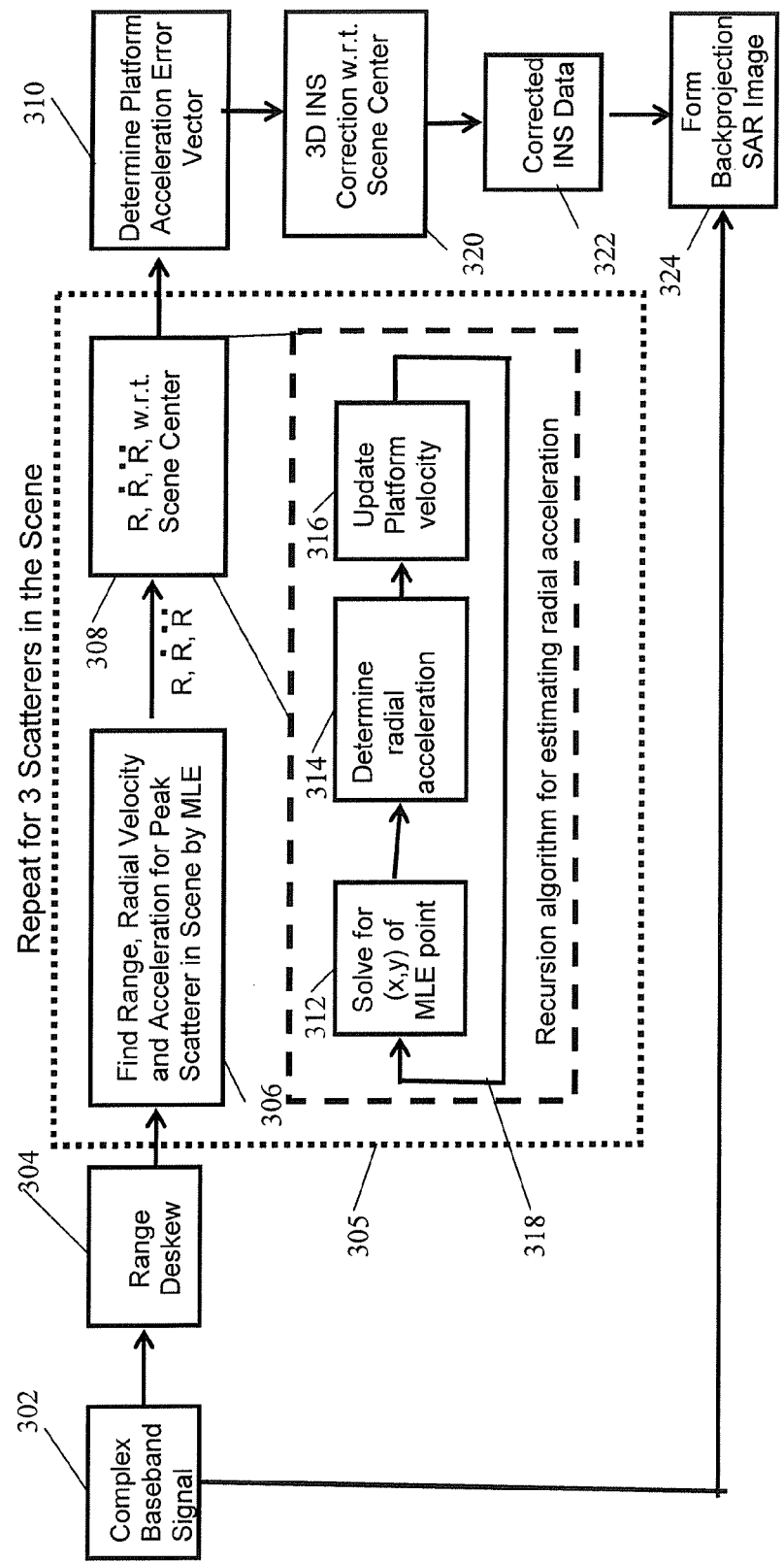
FIG. 3 is an exemplary process flow diagram for three dimensional INS data correction using MLE, according to some embodiments of the present invention.

FIG. 3 is an exemplary process flow diagram for three dimensional INS data correction using MLE, according to some embodiments of the present invention. Here, to obtain a 3-D INS correction data, multiple scatterers in the scene (e.g., three) are used. As shown, the baseband signal 302 is de-skewed in block 304, similar to the embodiment of FIG. 2 to form a radar image that includes a representation of the point of interest and a plurality of scatterers. The de-skewed signal is then used to obtain range (R), radial velocity (R') and acceleration (R") for each of the multiple scatterer in the scene, with respect to the scene center similar to process depicted in FIG. 2, in bock 308. The platform acceleration error vector is then determined in block 310. A 3-D INS correction with respect to the scene center is performed (by one or more processors) in block 320, resulting in correct 3-D INS data in block 322. The corrected 3-D INS data (block 320) may then be used to form backprojection of a SAR image resulting in a more focused SAR image, in block 324. These 3-D corrections are proven to be robust (insensitive) to significant height variation of the scatterers. For example, simulation results have shown that there is no significant variation in correction data for a scatterer up to 30 meters in height relative to the scene center.

Figure 4:
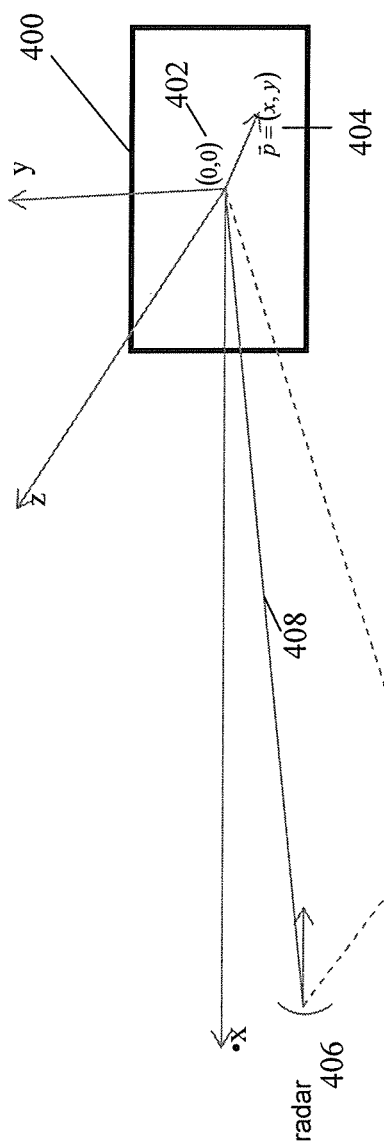
FIG. 4 is an exemplary diagram depicting a scene to be imaged and its location coordinates with respect to a moving platform, according to some embodiments of the present invention.

FIG. 4 is an exemplary diagram depicting a scene to be imaged 400 and its location coordinates with respect to a moving platform (radar), according to some embodiments of the present invention. The scene to be imaged 400 includes a scene center (point of interest) and an MLE focusing point 404 with its X and Y coordinates. Here, the Z (height) coordinate is ignored, because the process is proven to be robust/insensitive with respect to significant height variation of the scatterers. A moving platform with an on-board radar 406 has a line of sight 408 to the scene center 402. The following define range variation equations for imaging with INS acceleration errors.

$$R(t) = \|\vec{p}_r(t) - \vec{p}\|;$$

$$\vec{p}_r(t) = \vec{p}_r(0) + \frac{T}{2}\vec{v} + \frac{1}{2}\vec{\alpha}\left(\frac{T}{2}\right)^2 + \left(\vec{v} + \vec{\alpha}\frac{T}{2}\right)\left(t - \frac{T}{2}\right) + \frac{1}{2}\vec{\alpha}\left(t - \frac{T}{2}\right)^2$$

$$= \tilde{\vec{p}}_r(0) + \tilde{\vec{v}}\left(t - \frac{T}{2}\right) + \frac{1}{2}\vec{\alpha}\left(t - \frac{T}{2}\right)^2;$$

$$\tilde{\vec{p}}_r(0) = \vec{p}_r(0) + \frac{T}{2}\vec{v} + \frac{1}{2}\vec{\alpha}\left(\frac{T}{2}\right)^2;$$

-continued $$\tilde{\vec{v}}_r = \vec{v} + \vec{\alpha}\frac{T}{2};$$

$$t' = t - \frac{T}{2}$$

$$\tilde{R}(t') = \|\vec{p}_r(t) - \vec{p}\| \approx \tilde{R}(0) + \tilde{R}'(0)t' + \frac{1}{2}\tilde{R}''(0)t'^2$$

$$= \|\tilde{\vec{p}}_r(0) - \vec{p}\| + \frac{(\tilde{\vec{p}}_r(0) - \vec{p})}{\|\tilde{\vec{p}}_r(0) - \vec{p}\|} \cdot \tilde{\vec{v}}t' +$$

$$\frac{1}{2}\left(\frac{\|\tilde{\vec{v}}\|^2}{\|\tilde{\vec{p}}_r(0) - \vec{p}\|} - \frac{[(\tilde{\vec{p}}_r(0) - \vec{p}) \cdot \tilde{\vec{v}}]^2}{\|\tilde{\vec{p}}_r(0) - \vec{p}\|^3} + \frac{(\tilde{\vec{p}}_r(0) - \vec{p}) \cdot \vec{\alpha}}{\|\tilde{\vec{p}}_r(0) - \vec{p}\|}\right)t'^2$$

where, $$p = \begin{bmatrix} x \\ y \\ 0 \end{bmatrix} = \text{scatterer on ground } MLE \text{ picks up}$$

$\vec{p}_r(t)$=position of platform at time t
$\vec{p}$=position of the focusing point on the ground
$\vec{p}_r(0)$=position of platform at center of dwell
$\tilde{\vec{p}}_r$=position of platform at the end of the dwell
$\tilde{\vec{v}}$=platform velocity at the end of the dwell
$\vec{v}$=platform vector velocity near center of dwell
$\vec{\alpha}$=unknown acceleration vector (INS error)
T=dwell duration
t'=time relative to the center of the dwell
R(t)=Range from the antenna to the focusing point
$\tilde{R}(t')$=Range from the antenna to the focusing point at the center of the dwell
$\tilde{R}'$, $\tilde{R}''$=first and second time derivatives of $\tilde{R}(t')$ The dwell is the time period of the radar data collection. The center of the dwell refers to the mid-point of the radar collection time. The scene center is the point of interest on the ground selected by the radar operator.

The following define equations for solving for INS acceleration vector.

Solve for $\vec{p}_{MLE}$ from:

$$\begin{cases} R_{MLE} = \|\vec{p}_r(0) + \frac{T}{2}\vec{v} - \vec{p}_{MLE}\| = \|\tilde{\vec{p}}_r(0) - \vec{p}_{MLE}\| \\ R'_{MLE}(0) = \frac{(\tilde{\vec{p}}_r(0) - \vec{p}_{MLE})}{\|\tilde{\vec{p}}_r(0) - \vec{p}_{MLE}\|}\vec{v} \end{cases}$$

then solve $$R''_{MLE}(0) = \frac{\|\vec{v}\|^2}{\|\tilde{\vec{p}}_r(0) - \vec{p}_{MLE}\|} - \frac{[(\tilde{\vec{p}}_r(0) - \vec{p}_{MLE}) \cdot \vec{v}]^2}{\|\tilde{\vec{p}}_r(0) - \vec{p}_{MLE}\|^3} + \frac{(\tilde{\vec{p}}_r(0) - \vec{p}_{MLE}) \cdot \vec{\alpha}}{\|\tilde{\vec{p}}_r(0) - \vec{p}_{MLE}\|}$$

$$\left(\text{assuming } \|\vec{\alpha}\frac{T}{2}\| << \|\vec{v}\|\right)$$

Define: $\hat{\vec{p}} = \tilde{\vec{p}}_r(0) - \vec{p}_{MLE}$ then above equations are written as $$\begin{cases} R_{MLE} = \|\hat{\vec{p}}\| \Rightarrow (\hat{x}_0 - x_{MLE})^2 + (\hat{y}_0 - y_{MLE})^2 = R_{MLE}^2 - \hat{z}_0^2 \\ R'_{MLE}(0) = \dfrac{\hat{\vec{p}}}{\|\hat{\vec{p}}\|} \cdot \vec{v} \Rightarrow (\hat{x}_0 - x_{MLE})v_x + (\hat{y}_0 - y_{MLE})v_y = R_{MLE}R'_{MLE}(0) \end{cases}$$

ψ=angle between $\hat{\vec{p}}_{x,y}$ and $\vec{v}$ where $\hat{\vec{p}}_{x,y} = [\hat{x}_0 - x_{MLE} \; \hat{y}_0 - y_{MLE} \; 0]$ $$\psi = \cos^{-1}\left(\frac{R_{MLE} R'_{MLE}(0)}{\|\hat{\vec{p}}_{x,y}\| \|\vec{v}_{x,y}\|}\right);$$

$$\|\hat{\vec{p}}_{x,y}\| = \sqrt{R_{MLE}^2 - \hat{z}_0^2};$$

$$\hat{\vec{p}}_{x,y} \cdot \vec{v} = R'_{MLE}(0) R_{MLE}$$

$$\hat{\vec{p}}_{x,y} = \frac{\sqrt{R_{MLE}^2 - \hat{z}_0^2}}{\|\vec{v}_{x,y}\|} \begin{bmatrix} \cos\psi & -\sin\psi \\ \sin\psi & \cos\psi \end{bmatrix} \vec{v}_{x,y}$$

$$\vec{p}_{MLE} = [\hat{x}_0 \; \hat{y}_0] - \hat{\vec{p}}_{x,y}$$

where, $\vec{p}_r(t)$=position of platform at time t $\vec{p}_{MLE}$=estimated position of focusing point on the ground plane $R_{MLE}$=estimated range from antenna to the focusing point on the ground at the center of the dwell $R'_{MLE}$, $R''_{MLE}$=first and second derivatives of $R_{MLE}$ $\hat{\vec{p}}$=vector difference of focusing point position and the estimated point position vector $x_{MLE}, y_{MLE}$=estimated x and y positions of focusing point on the ground plane $\hat{x}_0, \hat{y}_0, \hat{z}_0$=true x, y, and z positions of focusing point on the ground plane $\hat{\vec{p}}_{x,y}$=vector difference of focusing point position and the estimated position along the x-y (ground $\vec{v}_{x,y}$=platform velocity vector along the x-y (ground) plane ψ=angle between $\hat{\vec{p}}_{x,y}$ and $\vec{v}$ Now, continue determining the estimate of radial acceleration using the following recursion:

$$\vec{\alpha}_{rad} = $$

$$\frac{(\tilde{\vec{p}}_r(0) - \vec{p}_{MLE}) \cdot \vec{\alpha}}{\|\tilde{\vec{p}}_r(0) - \vec{p}_{MLE}\|} = R''_{MLE}(0) - \frac{\|\vec{v}\|^2}{\|\tilde{\vec{p}}_r(0) - \vec{p}_{MLE}\|} + \frac{[(\tilde{\vec{p}}_r(0) - \vec{p}_{MLE}) \cdot \vec{v}]^2}{\|\tilde{\vec{p}}_r(0) - \vec{p}_{MLE}\|^3}$$

$$\left(\text{assuming } \left\|\vec{\alpha}\frac{T}{2}\right\| << \|\vec{v}\|\right)$$

Update $\vec{v}$ to $$\tilde{\vec{v}} = \vec{v} + \frac{T}{2}\vec{\alpha}_{rad}$$

and solve for $\vec{p}_{MLE}$ again where, $\vec{\alpha}_{rad}$=radial acceleration relative to focusing point In some embodiments, the above recursion of solving for the radial acceleration vector, updating the velocity, and again solving for the position of the focusing point on the ground plane is repeated 5-10 times, depending on system requirements. The above recursion process only estimates the radial acceleration vector. If the square components of the acceleration in three dimensions is desired, the above process is repeated for multiple points (scatterers) and the equations below are applied:

$$\frac{(\tilde{\vec{p}}_r(0) - \vec{p}_{MLE})}{\|\tilde{\vec{p}}_r(0) - \vec{p}_{MLE}\|} \cdot \vec{\alpha} = $$

$$\left(R''_{MLE}(0) - \frac{\|\vec{v}\|^2}{\|\tilde{\vec{p}}_r(\rightarrow) - \vec{p}_{MLE}\|} + \frac{[(\tilde{\vec{p}}_r(0) - \vec{p}_{MLE}) \cdot \vec{v}]^2}{\|\tilde{\vec{p}}_r(0) - \vec{p}_{MLE}\|^3}\right) \equiv \Omega_{MLE}$$

To solve for unknown acceleration INS error use $$\begin{bmatrix} (\tilde{\vec{p}}_r(0) - \vec{p}_{MLE,1})^T \\ (\tilde{\vec{p}}_r(0) - \vec{p}_{MLE,2})^T \\ (\tilde{\vec{p}}_r(0) - \vec{p}_{MLE,3})^T \end{bmatrix} \vec{\alpha} = \begin{bmatrix} \Omega_{MLE,1} \\ \Omega_{MLE,2} \\ \Omega_{MLE,3} \end{bmatrix};$$

$$\vec{\alpha} = \begin{bmatrix} (\tilde{\vec{p}}_r(0) - \vec{p}_{MLE,1})^T \\ (\tilde{\vec{p}}_r(0) - \vec{p}_{MLE,2})^T \\ (\tilde{\vec{p}}_r(0) - \vec{p}_{MLE,3})^T \end{bmatrix}^{-1} \begin{bmatrix} \Omega_{MLE,1} \\ \Omega_{MLE,2} \\ \Omega_{MLE,3} \end{bmatrix};$$

$$\vec{\alpha} = \begin{bmatrix} \alpha_x \\ \alpha_y \\ \alpha_z \end{bmatrix}$$

3 linear equations—3 unknowns: $\alpha_x, \alpha_y, \alpha_z$ where, $\vec{\alpha}$=acceleration estimate along three dimensions $\vec{p}_{MLE,1}$=estimated position of first focusing point on the ground plane $\vec{p}_{MLE,2}$=estimated position of second focusing point on the ground plane $\vec{p}_{MLE,3}$=estimated position of third focusing point on the ground plane $\Omega_{MLE,1}$=radial acceleration relative to first focusing point $\Omega_{MLE,2}$=radial acceleration relative to second focusing point $\Omega_{MLE,3}$=radial acceleration relative to third focusing point It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for calculating three dimensional residual motion errors of a moving platform with respect to a point of interest, the method comprising:
   (a) receiving a radar signal from the point of interest;
   (b) forming a radar image including representation of the point of interest and a plurality of scatterers;
   (c) using a maximum likelihood estimation (MLE) method to obtain range, radial velocity and radial acceleration of the moving platform for a first peak scatterer with a brightest point in the radar image;
   (d) correcting a location of the first peak scatterer with respect to a scene center of the point of interest;
   (e) updating the obtained radial acceleration of the moving platform responsive to the corrected location of the first peak scatterer;
   (f) updating the obtained radial velocity of the moving platform responsive to the updated radial acceleration;
   (g) recursively repeating (d), (e), and (f) for a predetermined number of times for the first peak scatterer; and
   (h) repeating (c), (d), (e), (f), and (g) for a second and a third scatterers in the radar image to obtain the three dimensional residual motion errors of the moving platform.

2. The method of claim 1, wherein said determined three dimensional residual motion errors of the moving platform are substantially insensitive to height variation of the scatterers.

3. The method of claim 1, further comprising utilizing the three dimensional residual motion errors to better focus a synthetic aperture radar (SAR) image.

4. The method of claim 1, further comprising utilizing the three dimensional residual motion errors in a Ground Moving Target Indicator (GMTI) or a Doppler Beam Sharpening (DBS).

5. The method of claim 1, wherein said MLE method comprises:
   determining MLE of range, radial velocity and radial acceleration of the moving platform by Keystone processing said radar signal,
   generating a first estimate of the range, radial velocity and radial acceleration of the moving platform based on the Keystone processed of said radar signal
   utilizing the first estimate to set up sampling intervals for performance of a coarse search, and
   performing a fine search using a Newton's method to determine the MLE range, radial velocity and radial acceleration of the moving platform for said first peak scatterer.

6. The method of claim 1, wherein said recursively repeating (d), (e), and (f) is performed for a range of 5 to 10 times, for each of the first peak scatterer, and the second and third scatterers.

7. The method of claim 1, further comprising utilizing the three dimensional residual motion errors to land the moving platform on the area of interest.

8. An onboard radar system for calculating three dimensional residual motion errors of a moving platform with respect to a point of interest comprising:
   an antenna for receiving a radar signal from the point of interest; and
   one or more processors configured to (a) form a radar image including representation of the point of interest and a plurality of scatterers, (b) use a maximum likelihood estimation (MLE) method to obtain range, radial velocity and radial acceleration of the moving platform for a first peak scatterer with a brightest point in the radar image, (c) correct a location of the first peak scatterer with respect to a scene center of the point of interest, (d) update the obtained radial acceleration of the moving platform responsive to the corrected location of the first peak scatterer, (e) update the obtained radial velocity of the moving platform responsive to the updated radial acceleration, (f) recursively repeat (c), (d), and (e) for a predetermined number of times for the first peak scatterer; and (g) repeat (b), (c), (d), (e), and (f), for a second and a third scatterers in the radar image to obtain the three dimensional residual motion errors of the moving platform.

9. The onboard radar system of claim 8, wherein said determined three dimensional residual motion errors of the moving platform are substantially insensitive to height variation of the scatterers.

10. The onboard radar system of claim 8, wherein the three dimensional residual motion errors are utilized to better focus a synthetic aperture radar (SAR) image.

11. The onboard radar system of claim 8, wherein the three dimensional residual motion errors are utilized in a Ground Moving Target Indicator (GMTI) or a Doppler Beam Sharpening (DBS).

12. The onboard radar system of claim 8, wherein said one or more processors are further configured to recursively repeat (d), (e), and (f) for a range of 5 to 10 times, for each of the first peak scatterer, and the second and third scatterers.

* * * * *